(No Model.)
G. HANNAH.
ELECTRIC ALARM FOR SHAFT BEARINGS.
No. 449,411. Patented Mar. 31, 1891.
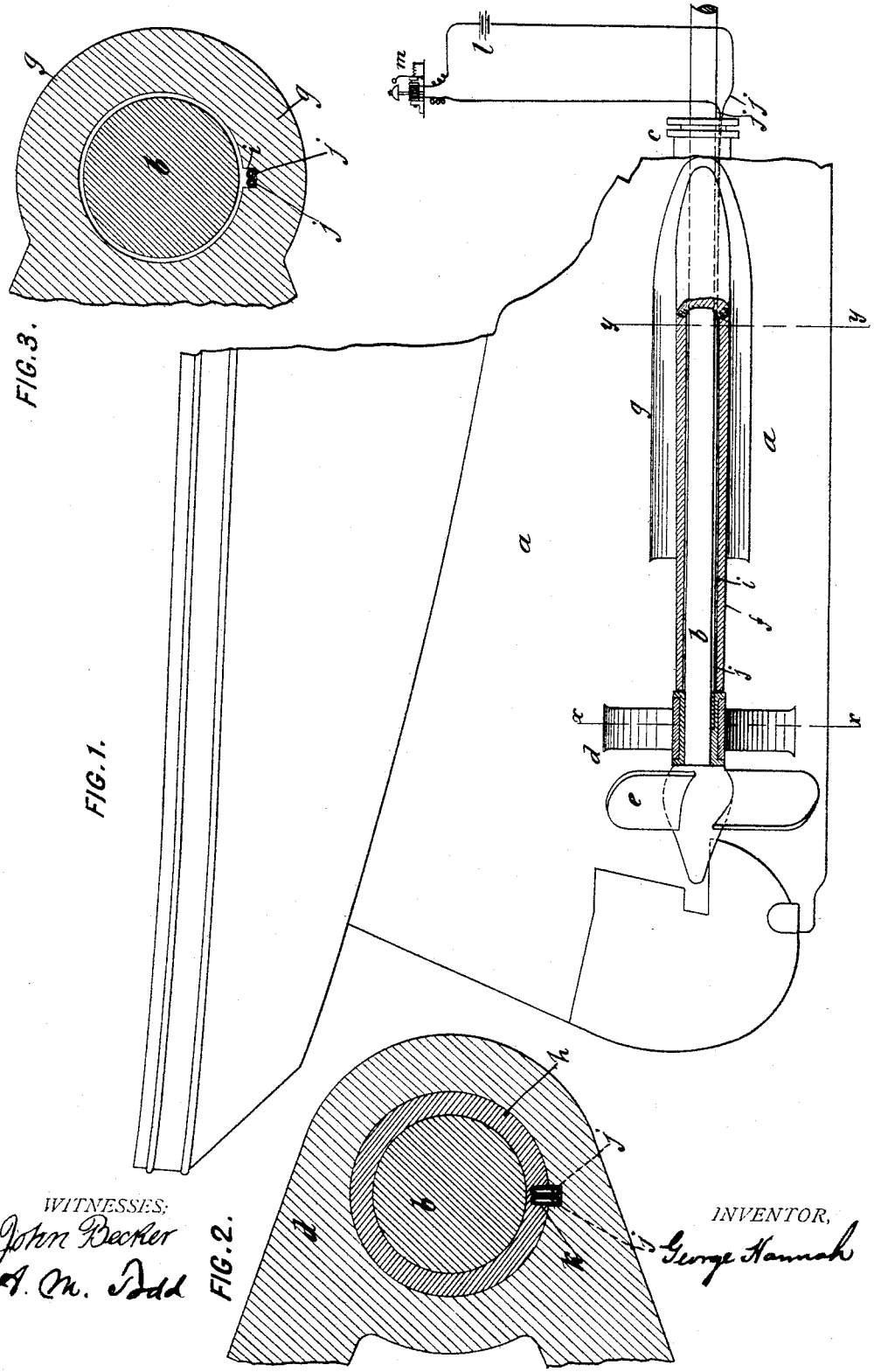
WITNESSES:
John Becker
A. M. Odd
INVENTOR,
George Hannah

UNITED STATES PATENT OFFICE.

GEORGE HANNAH, OF BROOKLYN, NEW YORK.

ELECTRIC ALARM FOR SHAFT-BEARINGS.

SPECIFICATION forming part of Letters Patent No. 449,411, dated March 31, 1891.

Application filed December 24, 1890. Serial No. 375,662. (No model.)

*To all whom it may concern:*

Be it known that I, GEORGE HANNAH, of the city of Brooklyn, in the county of Kings and State of New York, have invented certain new and useful Improvements in Electrical Tell-Tales for Twin-Screw Steamers, of which the following is a specification, reference being had to the accompanying drawings, forming part thereof.

The object of this invention is to promptly advise masters and engineers of twin-screw steamers of any derangement or wearing in the outboard bracket which supports the shaft, thus enabling them to stop in time the affected engine, and thereby prevent disaster. When it is remembered that such wearing on this bracket, if permitted to continue, would inevitably cause such deflection to the shaft as would result in breaking it and thereby entailing disastrous consequences to the engines, the utility of this invention will be apparent.

The invention may be carried out by running insulated electric wires, positive and negative, from the engine-room, at which place these wires would be connected with battery and indicator, and through and under the journals at the stuffing-box, and then along the tube which incases the shaft from the point where it goes outboard at the stuffing-box to where it rests on the bracket. At this point the insulated wires should turn from the horizontal to the perpendicular and terminate with their ends incased in the bracket-bearing—say about an inch or somewhat less—under its surface. The incasing-tube should have a groove made along its whole length, so that these insulated wires will rest in the bottom of same and out of reach of the shaft revolving therein. In the event of the bracket-bearing wearing down that half-inch, or whatever distance the "terminals" were set at, the shaft revolving would come in contact with the wires, the insulation be speedily worn off, contact made, the circuit closed, and the engineer immediately notified by the alarm-bell connected with the battery in the engine-room.

The current-wires may be conducted to the bearing from the shaft in other ways than above described without departing from my invention, which is the bringing of current-wires within the bracket a short distance below the shaft, so that unusual wear of the bearing by the revolution of the shaft will cause contact between the shaft and current-wires, and thereby close the circuit and cause an alarm to be given in the engine-room by the ringing of an electric bell. In case of the use of a dynamo for electric lighting, &c., on the steamer, the battery can be dispensed with.

In the drawings, Figure 1 is a side view of the stern of a vessel to which my invention is applied. Fig. 2 is a cross-section of the bracket and shaft-bearing, taken in the line $x\ x$ of Fig. 1. Fig. 3 is a cross-section taken in the line $y\ y$ of Fig. 1.

The invention therefore principally consists in arranging relatively to a shaft and below the normal wearing-surface of the bearing circuit-terminals insulated from each other in connection with an electric circuit.

$a$ is the side of the hull of a steamer.

$b$ is the starboard screw-shaft.

$c$ is the stuffing-box in the side of the vessel for this shaft to pass through.

$d$ is the outboard-bracket supporting the end of the shaft carrying the screw $e$.

$f$ is the tube incasing the shaft between the point at which the latter emerges from the stuffing-box and the point at which it enters the outboard bracket $d$. It enters the bracket resting upon a shoulder therein. $g$ is a portion thereof, filling the curvature of the side of the vessel and reaching a considerable distance out from the stuffing-box $c$, and serving as a further protection for the shaft $b$. $h$ is a shaft-bearing of the usual composition—Babbitt or other metal—inserted within the bracket $d$, and within which bearing the shaft $b$ revolves.

Along the lower portion of the casing-tube $f$, I form a groove $i$ deep enough to contain the wires $j\ j$ and free from any contact with the revolving shaft. These wires pass up through a vertical opening $k$ in the bottom of the bearing $h$ to within a short distance of its inner periphery, and they extend back to a battery $l$ and a signal-bell $m$, placed in the circuit at some convenient place for hearing an alarm, such as the engine-room.

The operation with the insulated wires arranged in manner as illustrated in the drawings is as follows: In case of any undue wear in the bearing caused by the revolution of the shaft, such as half an inch, the circuit-terminals being below the inner periphery and normal wearing-surface of the shaft-bearing that much, the surface of the revolving shaft will reach these terminals and abrade and destroy the insulation, thereby making electrical contact and closing the circuit. This will cause the electric bell to ring, and thereby give warning of such wear in the bearings. In place of insulating the wires an insulating lining might be placed in the casing and in the vertical opening $k$ in the bearing $h$, or both may be used.

I claim—

1. A shaft-bearing having circuit-terminals insulated from each other below the normal wearing-surface, and an electric circuit connected to said terminals.

2. A shaft-bearing having circuit-terminals insulated from each other below the normal wearing-surface, and an electric circuit connected to said terminals, containing an alarm.

GEORGE HANNAH.

Witnesses:
ANDREW M. TODD,
JOHN W. KONVALINKA.